United States Patent [19]
Fiori

[11] Patent Number: 4,657,284
[45] Date of Patent: Apr. 14, 1987

[54] REMOTELY MANIPULATABLE CLAMP

[75] Inventor: Robert Fiori, Comnaux, France

[73] Assignee: Commissariat a l'Energie Atomique, Paris, France

[21] Appl. No.: 836,332

[22] Filed: Mar. 5, 1986

[30] Foreign Application Priority Data

Mar. 8, 1985 [FR] France ................................ 85 03430

[51] Int. Cl.$^4$ ........................................... F16L 35/00
[52] U.S. Cl. ..................................... 285/39; 285/410; 285/420; 285/367; 24/205; 24/279
[58] Field of Search ............... 285/366, 367, 408, 409, 285/410, 411, 420, 407, 39; 24/279, 280, 205, 24

[56] References Cited

U.S. PATENT DOCUMENTS

| | | | |
|---|---|---|---|
| 1,568,043 | 1/1926 | Anderson | 24/279 |
| 1,797,383 | 3/1931 | Wahl et al. | |
| 2,397,438 | 3/1946 | Schmid | 285/420 X |
| 2,689,141 | 9/1954 | Kiekhaefer | 285/410 X |
| 3,964,774 | 6/1976 | Wollin et al. | 285/409 |
| 4,573,717 | 3/1986 | Peacock | 285/409 |

FOREIGN PATENT DOCUMENTS

| | | |
|---|---|---|
| 2040848 | 3/1972 | Fed. Rep. of Germany. |
| 1430344 | 1/1966 | France. |
| 824991 | 12/1959 | United Kingdom. |

Primary Examiner—Dave W. Arola
Attorney, Agent, or Firm—Pearne, Gordon, McCoy & Granger

[57] ABSTRACT

The clamp comprises two members articulated about a common pin. These members form on one side of the pin two half-clamps having profiles complimentary to that of the frustum-shaped nipples fixed to the pipes to be coupled together. On the opposite side, the members form two gripping levers between which is placed a compression spring for closing the clamp. By acting on the levers with the aid of a gripping tool, the clamp is opened and it can then be fitted to the nipples. The tightening of the clamp is controlled by a rocking bolt.

6 Claims, 3 Drawing Figures

REMOTELY MANIPULATABLE CLAMP

BACKGROUND OF THE INVENTION

The present invention relates to a remotely manipulatable clamp for connecting two pipes equipped at their ends with conical end pieces or nipples.

At numerous different methods are known for connecting or coupling together pipes. It is in particular known to equip pipes with conical nipples which are connected by means of a clamp having an internal frustum-shaped profile complimentary with respect to that of the nipples. This procedure has the advantage of making it possible to reduce the forces of stresses applied. Thus, the tightening or clamping force applied to the clamp makes it necessary to reduce the diameter thereof. The resulting radial force is converted into an axial clamping or tightening force by the cooperation of the complimentary frustum-shaped surfaces of the clamp and the nipples.

In the present state of the art, there are several types of clamps with a conical internal profile used for joining pipes equipped with frustum-shaped nipples. Thus, it is known to use articulated clamps, clamps with bushes, split collet clamps, etc. However, none of the existing clamps can be remotely manipulated with a single manipulator gripper, which leads to certain difficulties when it is wished to join by this procedure pipes to which access is only possible by means of manipulators. This is particularly the case with pipes located within confinement enclosures, particularly in the nuclear industry, as well as for pipes located at a point inaccessible to humans.

SUMMARY OF THE INVENTION

The present invention relates to a clamp for joining together pipes equipped with conical nipples, not suffering from the disadvantages of the existing clamps and which can be remotely manipulated with the aid of a single manipulator gripper, no matter whether the manipulator is of the mechanical master - slave type or is electronically controlled.

The present invention therefore specifically relates to a clamp for coupling together two pipes equipped at their ends with conical nipples having two half-clamps with a profile complimentary of that of the nipples and dismantlable tightening means joining the half-clamps, wherein the clamp comprises two members articulated about a common pin, said members forming on one side of said pin the two half-clamps and on the other side two gripping levers which can be drawn towards one another by a gripping tool, elastic means acting on said members to draw them towards a half-clamp closing position, in which said tightening means can be put into operation for joining the pipes.

According to a preferred embodiment of the invention, an adaptor is articulated on each of the gripping levers to receive a flange or shoe of the gripping tool.

According to another variant of the invention, the elastic means incorporate a compression spring placed between the gripping levers.

The tightening means can in particular be constituted by a rocking bolt mounted at the end of one of the half-clamps opposite to said pin, and by a shoe formed at the end of the other half-clamp opposite to said pin and provided with a slot for receiving said bolt.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
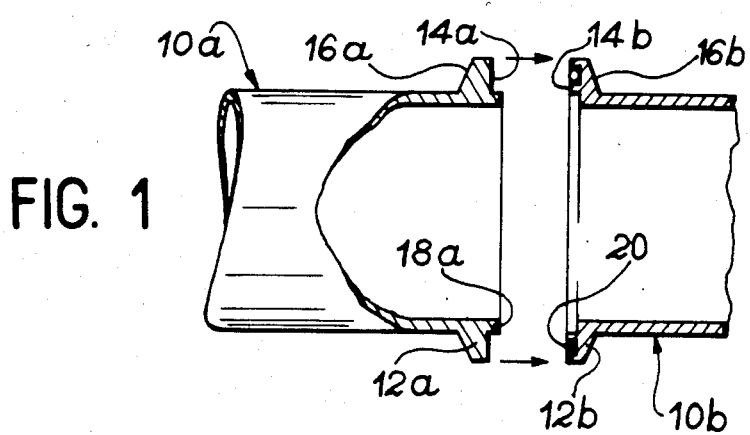
FIG. 1 A diagrammatic longitudinal sectional view of the adjacent ends of two pipes equipped with conical nipples able to receive the clamp according to the invention.

FIG. 1 shows the adjacent ends of two pipes 10a, 10b to be connected. Each of the ends of pipes 10a, 10b has a conical nipple or bush 12a, 12b respectively. These conical nipples can in particular be connected by welding. Each of them has a planar end face 14a, 14b respectively and a frustum-shaped opposite face 16a, 16b respectively. A protuberance 18a extending the nipple 12a is responsible for the centering of the pipe ends when they bear against one another. The sealing of the coupling is ensured by an annular joint 20 located in a groove formed on face 14b of nipple 12b and bearing on face 14a of nipple 12a when the nipples are in contact.

According to the invention, the coupling of pipes 10a, 10b of FIG. 1 is brought about by means of a remotely manipulatable clamp 22, which will now be described with reference to FIG. 2.

Clamp 22 according to the invention mainly comprises two members 24a, 24b articulated about a common pin 26. On one side of the hinge formed by pin 26 and located above that of FIG. 2, each of the members 24a, 24b forms a half-clamp 28a, 28b respectively. On the opposite side of the hinge formed by pin 26, i.e. below that when considering FIG. 2, each of the members 24a, 24b forms a gripping lever 30a, 30b respectively.

Figure 2:
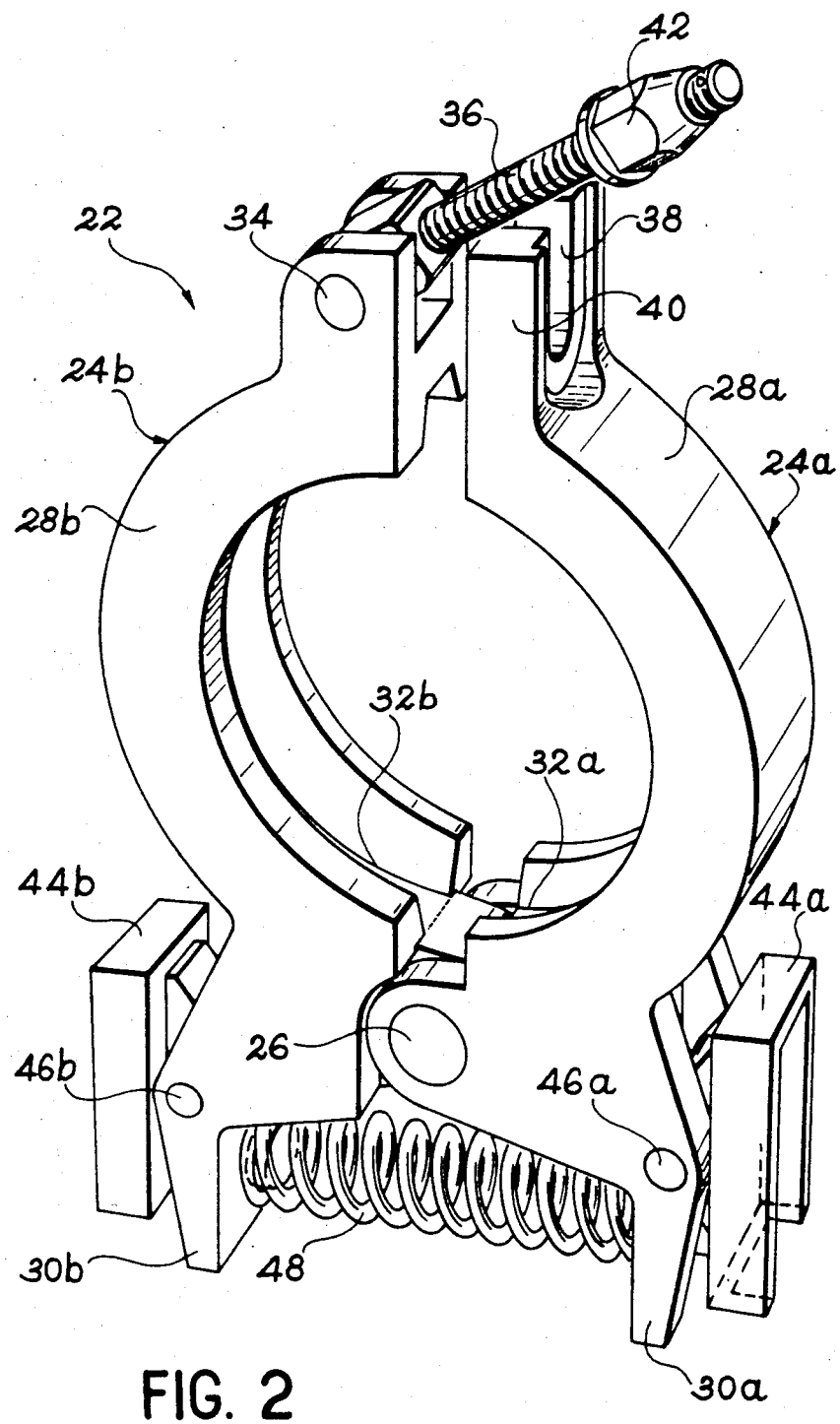
FIG. 2 A perspective, large scale view illustrating a preferred embodiment of the clamp according to the invention.

In side view, the half-clamps 28a, 28b are shaped like two complimentary half-circles when the clamp is closed in the manner illustrated in FIG. 2. The axes of the half-circles formed in section by the half-clamps 24a, 24b are oriented parallel to pin 26.

Each of the half-clamps 28a, 28b is provided on its inner face with a groove 32a, 32b respectively. The sides of these grooves 32a, 32b have a frustum-shape complimentary to that of faces 16a, 16b of nipples 12a, 12b of the pipes to be connected (FIG. 1). The width of grooves 32a, 32b is such that the tightening of clamp 22 has the effect of applying against one another the frustum-shaped nipples of the pipes by compressing joint 20.

At its end opposite to the hinge pin 26, half-collar 24b has a rocking bolt 36, pivotally connected thereto by means of a hinge pin 34 parallel to pin 26. When the clamp 22 is in the closed position, as illustrated in FIG. 2, bolt 36 can be located in a slot 38 formed in a shoe 40 radially extending the end of the half-clamp 24a opposite to hinge pin 26.

A nut 42 screwed on to bolt 36 is responsible for the tightening of the clamp by bearing against shoe 40. The force exerted by nut 42 on shoe 40 has the effect of pivoting the half-clamps 24a, 24b about pin 26, whilst moving them together. When the conical nipples, such as nipples 12a, 12b in FIG. 1 are placed in the grooves 32a 32b of the half-clamps, the cooperation of the frustum-shaped surfaces of the nipples and the grooves have the effect of engaging the nipples with one another. Thus, the tight connection of the pipes is achieved.

Each of the gripping levers 30a, 30b carries a part called an adaptor 44a, 44b respectively. Each of the adaptors is articulated to the corresponding lever about a pin 46a, 46b parallel to the hinge pin 26 of members 24a, 24b. Adaptors 44a, 44b are mounted on the opposite faces of levers 30a, 30b and their articulation on the latter makes it possible for them to adapt to the tightening movements of the manipulator grippers, which remain permanently parallel to one another, no matter what the positions occupied by members 24a, 24b about hinge pin 26. The outer faces of adaptors 44a, 44b have shapes complimentary to those of the shoes of the gripper or gripping tool used for manipulating clamp 22.

A compression spring 48 is compressed between levers 30a, 30b in order to move the latter apart. This position corresponds to the closing of clamp 22 which is therefore naturally in the closed position when no force is exerted on adaptors 44a, 44b.

Figure 3:
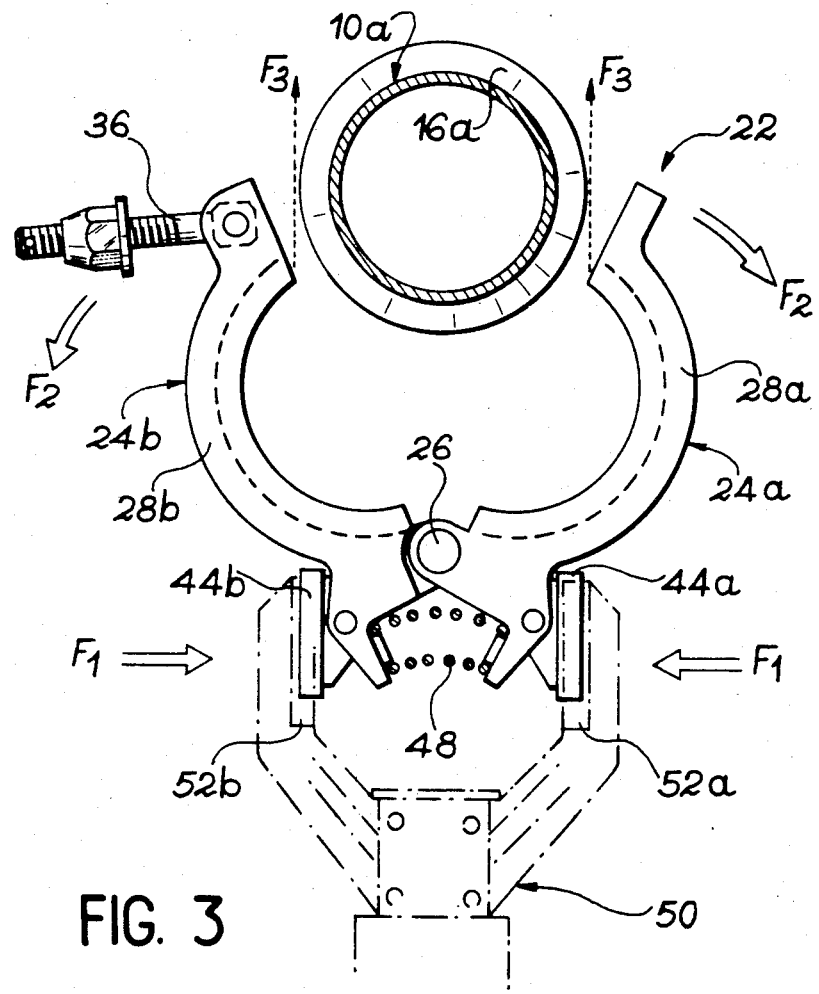
FIG. 3 A side view in part section diagrammatically illustrating the installation of the clamp of FIG. 2 with the aid of a manipulator gripper on the conical nipples of the two pipes shown in FIG. 1.

As is more particularly illustrated by FIG. 3, when it is wished to fit clamp 22 in order to join together two pipes equipped at their ends with two frustum-shaped nipples 16a, 16b (FIG. 1), each of the shoes 52a, 52b of a remote manipulator gripper 50 is placed in adaptors 44a, 44b of the clamp. By exerting a tigthening or clamping force in the direction of arrows F1 in FIG. 3 on the latter using gripper 50, the two members 24a, 24b are pivoted about pin 26 in the direction corresponding to the opening of the clamp (arrow F2 in FIG. 3). Obviously this movement is only possible if the rocking bolt 36 is disengaged from slot 38. The distance between the ends of the half-clamps 28a, 28b opposite to the hinge pin 26 then exceeds the external diameter of nipples 16a, 16b. It is therefore possible to cover the latter with the aid of clamp 22 by moving the latter in the direction of arrows F3 in FIG. 3 using the manipulator. In this position, the slackening of the tightening force F1 applied by gripper 50 to adaptors 44a, 44b enables the clamp 22 to reassume its closed inoperative position under the action of compression spring 48.

Clamp 22 is then immobilized about the nipples, so that the gripper 50 can be withdrawn from adaptors 44a, 44b and used for tilting or rocking bolt 36 in slot 38 and then for screwing down nut 42, in order to tighten the clamp.

This description has shown how the clamp according to the invention can be fitted and tightened with the aid of a single remote manipulator.

The disassembly of the clamp takes place in the opposite order of operations to that described hereinbefore and can also be carried out with the aid of a single manipulator.

Obviously the invention is not limited to the embodiment described in exemplified manner hereinbefore and covers all variants thereof.

Thus, adaptors 44a, 44b can have a random shape suitable for the shape of the gripper shoes and they can also be eliminated if the shape of levers 30a, 30b permits a direct action of the gripper thereon. The compression spring 48 can also be replaced by any other elastic member, such as a torsion spring mounted on hinge pin 26. Finally, the rocking bolt and slot associated therewith can be replaced by any known tightening or locking means permitting a tightening and loosening of the clamp with the aid of a manipulator.

What is claimed is:

1. A clamp for coupling together two pipes having at respective ends conical nipples, said clamp having two half-clamps with a profile complimentary of that of the nipples and dismantlable tightening means for joining the half-clamps to effect the coupling of said nipples, wherein the clamp comprises two members articulated about and hingedly connected by a common pin lying along an axis parallel to said pipes, said members forming on one side of said pin the two half-clamps and on the other side two gripping levers which can be drawn towards one another by a gripping tool wherein said half-clamps spread apart, elastic biasing means acting on said members to draw said half-clamps toward each other to a half-clamp closing position in which said tightening means can be operated for joining the half clamps to effect coupling of the nipples, said clamp including an adaptor articulated on and connected to each of the gripping levers to receive a shoe portion of said gripping tool.

2. A clamp for coupling together two pipes having at respective ends conical nipples, said clamp having two half-clamps with a profile complimentary of that of the nipples and dismantlable tightening means for joining the half-clamps to effect the coupling of said nipples, wherein the clamp comprises two members articulated about and hingedly connected by a common pin lying along an axis parallel to said pipes, said members forming on one side of said pin the two half-clamps and on the other side two gripping levers which can be drawn towards one another by a gripping tool wherein said half-clamps spread apart, elastic biasing means acting on said members to draw said half-clamps toward each other to a half-clamp closing position, in which said tightening means can be operated for joining the half-clamps to effect coupling of the nipples, said clamp including a tightening means comprising a rocking bolt mounted to the end of one of the half-clamps opposite to said pin and a shoe formed on the end of the other half-clamp opposite to said pin and provided with a slot for receiving said bolt.

3. A clamp for coupling two pipes together, adjacent ends of said pipes having nipples, each of said nipples being provided with a frustum-shaped rear face, wherein said clamp members joined together by a common articulation pin, each of said members forming a half-circle shaped half-clamp on one side of said pin and a gripping lever on the other side of said pin, tightening means being adapted to interconnect the ends of said half-clamps opposite to said pin, each of said half-clamps forming a half-circle having an axis parallel to the axis of said pin and being provided with an inner groove adapted to receive simultaneously said nipples, said inner groove forming side faces having a frustum shape complementary to the shape of said frustum-shaped rear faces, in such a way that actuation of said tightening means results in engaging the nipples with one another, said clamp further comprising elastic means acting simultaneously on said clamp members to draw the latter towards a closed position of said clamp, in which the half-circles formed by the half-clamps are complementary.

4. A clamp according to claim 3, wherein the gripping levers have opposite faces, an adaptor being mounted on each said opposite faces, each adaptor being articulated about a respective axis parallel to the axis of said pin.

5. A clamp according to claim 3, wherein the elastic means comprise a compression spring placed between the gripping levers.

6. A clamp according to claim 3, wherein the tightening means comprise a rocking bolt mounted at said end of one of the half-clamps and a shoe formed on said end of the other half-clamp and provided with a slot for receiving said bolt.

* * * * *

UNITED STATES PATENT AND TRADEMARK OFFICE
CERTIFICATE OF CORRECTION

PATENT NO. : 4,657,284

DATED : April 14, 1987

INVENTOR(S) : Robert Fiori

It is certified that error appears in the above-identified patent and that said Letters Patent is hereby corrected as shown below:

Column 1, line 9, after "At", insert --present--.

Signed and Sealed this

Twenty-seventh Day of October, 1987

*Attest:*

DONALD J. QUIGG

*Attesting Officer*  *Commissioner of Patents and Trademarks*